(12) United States Patent
Michi et al.

(10) Patent No.: US 7,472,018 B2
(45) Date of Patent: Dec. 30, 2008

(54) VEHICLE GUIDANCE SYSTEM

(75) Inventors: Harald Michi, Oelbronn-Duerrn (DE);
Michael Scherl, Bietigheim (DE);
Michael Weilkes, Sachsenheim (DE);
Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 516 days.

(21) Appl. No.: 10/531,343

(22) PCT Filed: May 19, 2003

(86) PCT No.: PCT/DE03/01596
§ 371 (c)(1),
(2), (4) Date: Sep. 26, 2005

(87) PCT Pub. No.: WO2004/041578
PCT Pub. Date: May 21, 2004

(65) Prior Publication Data
US 2006/0100775 A1 May 11, 2006

(30) Foreign Application Priority Data
Nov. 2, 2002 (DE) .................... 102 51 038

(51) Int. Cl.
*G01C 21/36* (2006.01)

(52) U.S. Cl. .................... 701/200; 701/210
(58) Field of Classification Search ............ 701/200, 701/210, 23, 25–26, 93, 117
See application file for complete search history.

(56) References Cited

U.S. PATENT DOCUMENTS 5,315,295 A * 5/1994 Fujii .................... 340/936

FOREIGN PATENT DOCUMENTS

| DE | 196 54 769 | 7/1998 |
|---|---|---|
| EP | 0 989 012 | 3/2000 |
| FR | 2 796 893 | 2/2001 |
| WO | WO 01 87659 | 11/2001 |

OTHER PUBLICATIONS

SAE Paper No. 961010, "Adaptive Cruise Control System, Aspects and Development Trends," Winner et al., 1996.

* cited by examiner

*Primary Examiner*—Yonel Beaulieu
(74) *Attorney, Agent, or Firm*—Kenyon & Kenyon LLP

(57) ABSTRACT

A method is provided for generating control variables for guiding a motor vehicle as a function of input quantities representing the traffic situation, and as a function of dynamically changeable parameters. The method provides that a single evaluation quantity is formed from a set of a plurality of input quantities, and a plurality of the parameters are determined on the basis of the single evaluation quantity.

8 Claims, 2 Drawing Sheets

VEHICLE GUIDANCE SYSTEM

FIELD OF THE INVENTION

The present invention relates to a method and a device for providing control variables for guiding a motor vehicle.

BACKGROUND INFORMATION

Vehicle guidance systems known in the art support the driver by providing longitudinal guidance of the vehicle (acceleration and deceleration) and/or during transverse guidance (tracking, steering). The functions of such guidance systems range from simple speed regulation to a desired speed selectable by the driver via adaptive cruise control (ACC) in which the distances to preceding vehicles are also taken into consideration, to completely autonomous vehicle guidance. Further examples of functions of such a vehicle guidance system include the automatic generation of collision warnings or the automatic introduction of emergency braking or evasive maneuvers to avoid or minimize the effects of collisions. The traffic situation is determined using sensors attached to the vehicle, the signals of which are supplied as input quantities to a control unit. The input quantities relate to the motion values of the guided vehicle itself, e.g., its driving speed, acceleration, yaw velocity, and the like, as well as to information regarding the traffic environment, in particular location data for preceding vehicles and other obstacles as well as any applicable information regarding the road course, the road condition, and the like. One or more distance sensors are typically provided for acquiring location data, e.g., a radar sensor for measuring distances and relative speeds of radar targets, in the case of a radar sensor having angular resolution also for measuring the azimuth angle of the radar targets, or lidar sensors, or camera systems, in particular stereo camera systems having electronic image processing. The control unit uses the input quantities supplied by these sensors to calculate control variables that act on the vehicle via control elements of the drive system and in some instances also of the braking system. An example of an ACC system of this type is described in SAE paper no. 96 10 10, "Adaptive Cruise Control System, Aspects and Development Trends", Winner et al., 1996.

The calculation of the control variables by the control unit depends on a plurality of parameters, of which several may be changed dynamically even during the control operation as a function of the traffic situation.

For example, during radar-supported distance control, a plurality of objects are typically located at the same time by the radar system. An object list is then created in which the individual objects are represented by their distance, relative speed, and angle data. During the periodically repeated radar measurements, a tracking procedure is used to identify the objects detected in the current measurement via the objects detected in previous measurements, and the movements of the individual objects are tracked. Since according to distance control a vehicle directly ahead in the same lane is to be followed at a suitable safety distance, a parameter is required that specifies which of the plurality of objects is to be selected as the target object for the distance control. This parameter should be adjusted to the particular traffic situation on the basis of suitable criteria.

In practice, the input signals transmitted from the sensors to the control unit are more or less noise-infested and must therefore be processed using a suitable filter. Each of these filter procedures is influenced by one or more parameters that determine the temporal resolution of the filter, e.g., integration times, decay rates, or the selection of frequency ranges in the frequency spectrum of the signal. The filters must each be parameterized such that sufficient noise and interfering signal suppression is achieved and also that input quantity changes are transmitted with sufficient speed to allow for timely reaction of the guidance system.

Predictive controllers that extrapolate the movements of the own vehicle and those of the located objects for the future, thereby predicting the traffic situation for a future point in time are often used in the control unit. The control variables are then calculated such that an optimum adjustment to the predicted traffic situation is achieved within a certain optimization time interval. Longer prediction time periods and optimization time intervals lead to "predictive" performance of the guidance system and as such to significant driving comfort but have the disadvantage that the probability of false forecasts increases and suddenly occurring changes may not be reacted to appropriately in some instances. Therefore, these parameters are also to be suitably determined.

Furthermore, it must be decided when predicting the future development of an input quantity, e.g., the distance from an object, whether linear extrapolation is to be performed under the assumption that the relative speed remains constant, or quadratic extrapolation under the assumption of constant acceleration, or an extrapolation of an even higher order. In some instances, in the case of sudden state changes, e.g., during an abrupt braking maneuver of the preceding vehicle, plausible assumptions must also be made in the prediction as to how long this state will last.

In general, the determination of the parameters that determine the behavior of the different control functions of the control unit require an evaluation of the traffic situation. To date, either the measured or derived kinetic state quantities of the own vehicle and the detected objects, e.g., the speed of the own vehicle, the distance and the relative speed of the preceding vehicle, etc., or simple quantities derived from these state quantities, e.g., the time to collision (TTC), i.e., the calculated time to impact, have been used as the situation-specific quantities for this evaluation.

SUMMARY

The method and the device of the present invention have the advantage that the different parameters are able to be adapted more efficiently to the particular traffic situation.

In the method of the present invention, a single evaluation quantity that characterizes the traffic situation and is used as the basis for determining a plurality of parameters is formed from a set of at least two input quantities in order to evaluate the traffic situation. In terms of mathematics, the single evaluation quantity is a scalar function on the vector space defined by the plurality of input quantities. For example, this evaluation quantity may be viewed as a measure of the situation's level of danger. If the evaluation quantity has a high value, the parameters should be adjusted accordingly in the control unit so that the situation is able to be reacted to with a shorter response time. Once this evaluation quantity has been calculated, it is available for determining a plurality of parameters at the same time so that a complex system of evaluation criteria does not need to be checked each time for the determination of the individual parameters. In this manner, minimal calculational effort is required to adjust system performance quickly and efficiently to the traffic situation, particularly in critical situations.

The dependence of the evaluation quantity on the input quantities may be provided by an at least two-dimensional characteristic map that is able to be stored digitally in the control unit. The number of dimensions of the characteristic map corresponds to the number of input quantities in the associated set. These input quantities may be used to address the characteristic map memory directly so that the evaluation quantity is able to be determined in the shortest time. Since all or at least several parameters are dependent on the same evaluation quantity, characteristic map storage requires only a reasonable amount of memory space.

It is advantageous for the evaluation quantity to be used for target object selection. Every located object is then allocated to a set of input quantities that includes in particular the distance and the relative speed of the object and is used to form a characteristic evaluation quantity for this object. In the case of a higher-dimensional characteristic map, the set of input quantities may also include, for example, the relative acceleration of the object, the azimuth angle of the object, the speed of the own vehicle, and the like. The evaluation quantity is then a measure of the relevance of the object so that the target object may be selected in that the object for which the evaluation quantity is greatest is selected. The maximum evaluation quantity then also forms the basis for determining the remaining parameters, such as filter parameters, optimization time intervals, and the like.

The evaluation quantity may be a fictitious quantity or may alternatively have a specific physical significance. For example, when approaching a preceding vehicle, the evaluation quantity may be defined by the constant (negative) acceleration that would be necessary to adjust the own vehicle speed to that of the preceding vehicle, i.e., to reduce the relative speed of the target object to zero, without the distance to the target object decreasing to less than a critical minimum distance. This minimum distance may then be dependent on further input quantities, e.g., the own vehicle speed and the time gap selected by the driver (object distance divided by relative speed) with which the target object is followed.

If the actual distance to the target object is already less than the critical distance, the evaluation quantity may be defined as the constant acceleration that is needed to increase the object distance within a certain time interval, which may then be dependent on other input quantities, to the critical distance. In total, the evaluation quantity is then defined differently for different regions of the characteristic map, and the two definitions are adapted to one another such that the evaluation quantity is always at the region limit of the characteristic map. The evaluation quantity decreases preferably monotonically in the "object distance" dimension as well as in the "relative speed" distance. Therefore, it increases as the object comes closer and as the approach speed (negative relative speed) increases.

DETAILED DESCRIPTION

Figure 1:
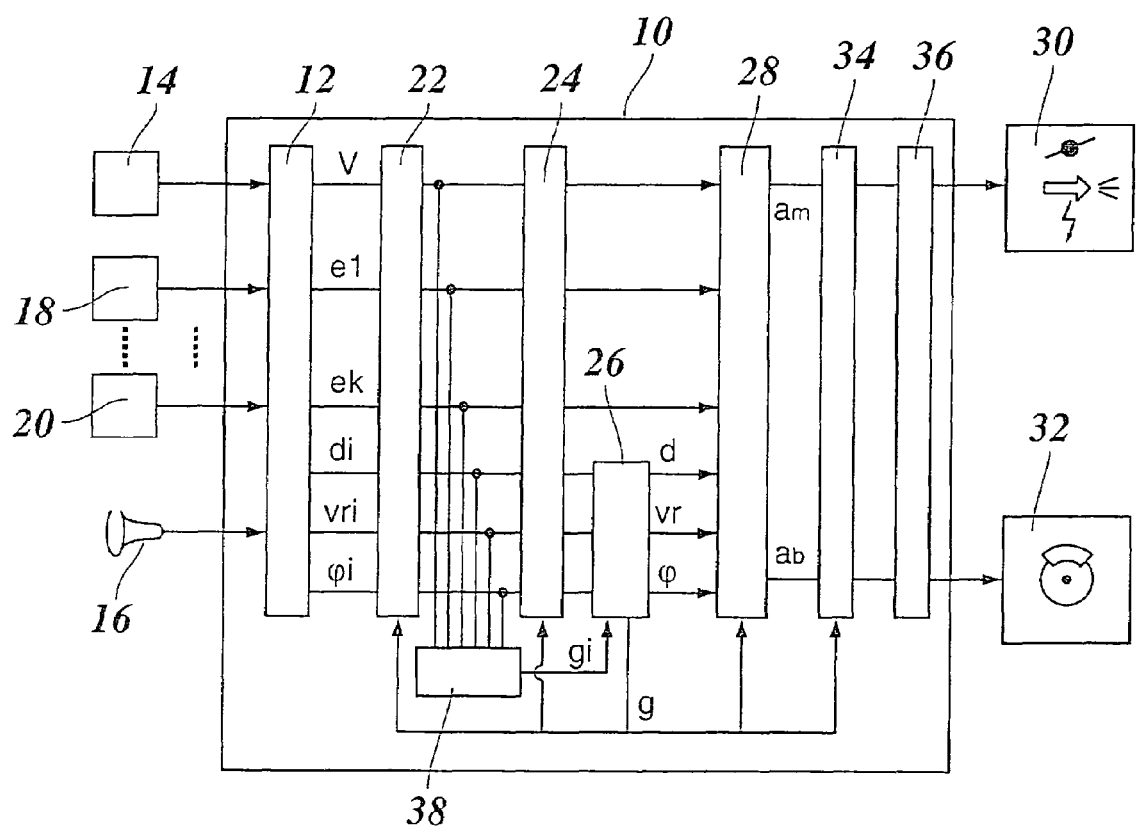
FIG. 1 shows a block diagram of a device for providing control variable for vehicle guidance.

A control unit 10, which is installed in a motor vehicle and is used to provide control variables for vehicle guidance, is shown in FIG. 1. Control unit 10 has an input circuit 12, which receives input quantities from different vehicle sensors, in particular from a speed sensor 14, which measures vehicle speed V of the vehicle, and from a locating device 16, e.g., a radar sensor, which provides location data for preceding vehicles and other potential obstacles. Additional sensors 18, 20, which provide further input quantities el-ek, are only shown as two discrete sensors in FIG. 1, but a greater plurality of sensors may be used, as indicated by the dotted line shown in FIG. 1. Alternatively, the functions of sensors 14, 18, 20 may also be assumed by other system components of the vehicle that are capable of providing input quantities. Therefore, for example, speed V, the yaw acceleration of the vehicle, or an input quantity that provides friction coefficients $\mu$ of the road may also be provided by an electronic stability system (EPS) of the vehicle.

In the example shown, input circuit 12 forms a set of three input quantities, namely object distance di, relative speed vri of the object, and azimuth angle $\phi$i of the object, for every located object i from the signals of locating device 16.

A filter circuit 22, in which every input quantity is prepared with the help of a suitable filter, is downstream from input circuit 12. The function of every filter in filter circuit 22 depends on one or more filter parameters. For example, it is possible for an input quantity to be determined in filter circuit 22 over a specific integration time interval in order to suppress noise and interference signals. The length of the integration time interval would then be such a filter parameter. It is also possible for a floating mean value to be formed from an input quantity in that a weighted sum is formed from the values of this input quantity measured in a plurality of previous measuring cycles, the weighting factors reducing exponentially with a certain time constant. This time constant would also be an example of a filter parameter.

In the example shown, the filtered input quantities are supplied to a prediction unit 24, which predicts the future temporal development of the input quantities on the basis of the input quantities and the temporal derivations of the same and determines which value the associated input quantity will have at a certain time in the future, i.e., after a certain prediction time period has elapsed. These prediction time periods may differ in duration for the individual input quantities and are determined as a function of the situation dynamics and under consideration of the reaction time of the vehicle guidance system.

Input quantities di, vri und $\phi$i recorded, filtered, and predicted for each individual object i are supplied to a selection module 26, which selects a single object as the target object from the plurality of objects. As a rule, the selected target object is the directly preceding vehicle in the own lane. During target object selection, the probability that the object is in the controlled vehicle's own lane is first calculated for every individual object on the basis of the azimuth angle and the distance. If this probability is above a certain threshold value, the object is allocated to the controlled vehicle's own lane. If a plurality of objects were allocated to the controlled vehicle's own lane, the object having smallest object distance di is typically selected as the target object.

Location data d, vr, and $\phi$ of the selected target object is supplied together with the remaining input quantities to a controller 28, which calculates a control variable $a_m$ for control element 30 of the vehicle drive system or a control variable $a_b$ for control element 32 of the vehicle brake system, from these input quantities using known control algorithms.

In the present example, downstream in controller 28 is a limiting unit 34, which limits control variables $a_m$ and $a_b$ and/or their change rates such that abrupt acceleration or braking operations are prevented, thereby achieving high driving comfort. The control variables limited in this manner are then output via an output circuit 36 to control elements 30, 32.

The functions of filter unit 22, prediction unit 24, selection module 26, controller 28, and limiting unit 34, which are shown in FIG. 1 as separate blocks for the sake of clarity, may be performed in practice by one or more microprocessors.

Filtered input quantities V, el-ek, di, vri, φi as well as any derived quantities, e.g., temporal derivations, are supplied to an evaluation module 38 which forms an evaluation quantity gi, which provides a measure of how critical the particular traffic situation is with regard to the respective object, from these input quantities for every located object. Object-specific evaluation quantities gi are supplied to selection module 26 and are used there as criteria for target object selection: The object for which evaluation quantity gi is greatest is selected as the target object. This maximum evaluation quantity g is then transmitted from selection module 26 to filter unit 22, prediction unit 24, controller 28, and limiting unit 34, and this single evaluation quantity determines there the selection of the filter parameters, the prediction time periods, as well as additional parameters of the control algorithms executed in controller 28 and the limiting function of limiting unit 34. These parameters are optimized in this manner to the particular traffic situation.

If a high value of maximum evaluation quantity g indicates a critical situation, the filter parameters in filter unit 22 and the parameters in controller 28 are generally changed in terms of a shorter response time, and the prediction time periods in prediction unit 24 may be shortened. The limiting functions in limiting unit 34 may be changed such that greater accelerations or decelerations as well as faster changes in acceleration and deceleration values are allowed in critical situations.

A basic component of evaluation module 38 is a multi-dimensional characteristic map, e.g., in the form of a digital characteristic map memory, which is addressed by the microprocessor or one of the microprocessors using digital data representing the input quantities. The number of dimensions of the characteristic map corresponds with the number of considered input quantities, including the quantities derived therefrom in some instances. However, only one dimension is provided for object distances di of the different objects and accordingly also for the relative speeds and the azimuth angle of the objects. Evaluation quantities gi are formed consecutively in that the characteristic map memory is addressed in each case with the data for the respective object.

Figure 2:
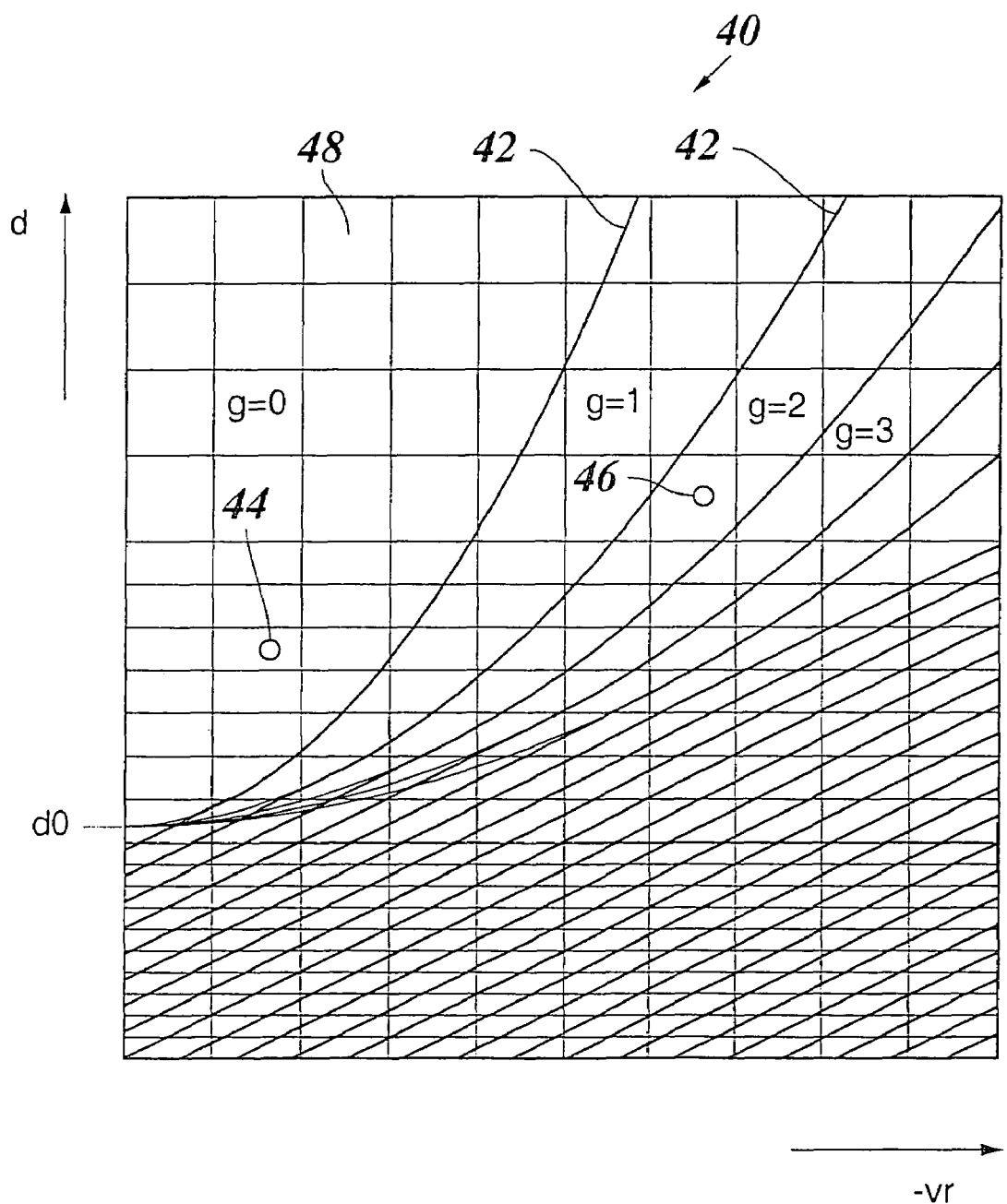
FIG. 2 shows an example of an evaluation quantity defined by a two-dimensional characteristic map.

FIG. 2 shows a simplified example of a two-dimensional section of a characteristic map 40 having dimensions d (object distance) and vr (relative speed of the object). Curves 42 drawn in in the characteristic map represent "isolines" for which evaluation quantity g (object subscript i is dispensed with in this instance) has a constant value in each case. As a result, isolines 42 divide the characteristic map into zones having different values of g (g=1, g=2, ... ).

In the present example, isolines 42 each have a parabola-shaped section corresponding with the function:

$$d=d0+vr^2/(2*g) \quad (1)$$

This is based on the following physical interpretation: It is assumed that the own vehicle is approaching a preceding vehicle at a distance d with relative speed vr (vr is negative). Evaluation quantity g then represents the constant deceleration (negative acceleration) of the vehicle that would be necessary for the own vehicle to approach the object at a certain critical distance d0 and be braked to the absolute speed of the object so that vr=0 is true. The absolute speed of the object is used as a constant in this process.

The above interpretation is only practical when actual object distance d is greater than d0. In limit case d=d0, the vehicle deceleration and as such evaluation quantity g would have to assume infinitely high values which is physically impossible. Therefore, following equation (2) is used as the determination equation for isolines 42 instead of above equation (1) in the case of short object distances:

$$d=d0-T*vr-g*T^2/2 \quad (2)$$

The physical interpretation of this equation (2) is that evaluation quantity g corresponds with the constant vehicle deceleration that is necessary to achieve critical distance d0 within a certain time period T. The definition is also usable under the condition d<d0. Equation (2) is the equation of a Straight line and therefore corresponds with a straight section of respective isoline 42. The parabola-shaped section and the straight section are continuously connected to one another for every value of g so that a continuous characteristic map results that decreases monotonically in d as well as in vr.

Additional dimensions of the characteristic map not shown in FIG. 2 may relate to own vehicle speed v as well as to driver-selected target time gap τ=d/vr with which a preceding vehicle is to be followed. Every combination of values of quantities V and τ yields an additional two-dimensional characteristic map analogous to FIG. 2 that may differ from the characteristic map according to FIG. 2, for example in the selection of critical distance d0 and in the selection of time interval T.

In FIG. 2, two objects 44, 46 are drawn in as examples that are represented by a corresponding value pair (vr, d). Both objects 44, 46 are to be located in the controlled vehicle's own lane. Object 44 is the directly preceding vehicle while object 46 is the vehicle in front of the preceding vehicle and therefore is at a greater distance d. While the directly preceding vehicle, i.e., object 44, would normally be selected as the target object, the method described here for object selection results in object 46, i.e., the vehicle in front of the directly preceding vehicle, being selected as the target object in the situation shown in FIG. 2 because evaluation quantity g is greater for this object 46. In practice, this would correspond with the situation that the vehicle in front of the directly preceding vehicle (object 46) performed an abrupt braking operation so that its relative speed is very high according to the amount. Directly preceding vehicle (object 44) has not yet reacted to this braking operation and therefore still has a relative speed of approximately 0. As a result of the method described here, the selection of object 46 as the target object would predictively take the braking operation of this vehicle into account and would reduce the own vehicle speed prior to the directly preceding vehicle reacting to the braking operation. This system performance not only contributes in practice to an increase in driving safety but also to a significantly increase the continuity in traffic flow in the case of high traffic density.

In FIG. 2, characteristic map 40 is divided into quadratic or rectangular cells 48. Each of these cells 48 represents a memory cell of the digital characteristic map memory. Cells 48 are different sizes in different regions of characteristic map 40, and they are smallest where evaluation quantity g changes most radically, i.e., where isolines 42 are closest together. The variable size of cells 48 results in sufficiently high resolution of the characteristic map as well as a significant decrease in the memory space requirement, in particular for high-dimensional characteristic maps.

What is claimed is:

1. A method for guiding a motor vehicle, comprising:
    forming a single evaluation quantity from a plurality of input quantities that represent a traffic situation;
    determining a plurality of dynamically changeable parameters based on the single evaluation quantity; and
    providing control variables for guiding the motor vehicle as a function of the plurality of input quantities that represent a traffic situation and as a function of the dynamically changeable parameters;

wherein:
the plurality of input quantities include location data of located objects;
the method is used to provide control variables for adaptive speed control of the vehicle;
a parameter selected on the basis of the single evaluation quantity relates to a selection of a target object from a plurality of located objects;
an object-specific evaluation quantity is formed for each of a plurality of located objects on the basis of location data for the corresponding object; and
an object having the greatest object-specific evaluation quantity is selected as the target object.

2. The method as recited in claim 1, wherein the single evaluation quantity is monotonically dependent on a distance to a located object and on a relative speed of the located object.

3. The method as recited in claim 1, wherein the single evaluation quantity is determined from the plurality of input quantities, on the basis of a multi-dimensional characteristic map.

4. The method as recited in claim 3, wherein the characteristic map is divided into at least two zones that correspond to different ranges of object distance, and wherein the single evaluation quantity is calculated according to different functions depending on a particular zone of the characteristic map, and wherein the different functions merge at the border between the two zones.

5. The method as recited in claim 1, wherein at least one of the dynamically changeable parameters determined on the basis of the single evaluation quantity is a parameter that determines at least one of speed of changes and extent of changes in the control variable resulting from changes in the input quantities.

6. The method as recited in claim 5, wherein the at least one of the dynamically changeable parameters determined on the basis of the single evaluation quantity is a filter parameter for filtering at least one of the input quantities.

7. A device for providing control variables for guiding a motor vehicle, comprising:
a control unit for receiving from sensors a plurality of input quantities representing a traffic situation, calculating the control variables from the plurality of input quantities, and outputting the control variables to control elements of at least one of a drive system and a brake system of the motor vehicle;

wherein:
the control unit is configured to: a) form a single evaluation quantity from the plurality of input quantities that represent the traffic situation; b) determine a plurality of dynamically changeable parameters based on the single evaluation quantity; and c) provide the control variables for guiding the motor vehicle as a function of the plurality of input quantities that represent a traffic situation and as a function of the dynamically changeable parameters;
the plurality of input quantities include location data of located objects;
the control variables are provided for adaptive speed control of the vehicle;
a parameter determined on the basis of the single evaluation quantity relates to a selection of a target object from a plurality of located objects;
an object-specific evaluation quantity is formed for each of a plurality of located objects on the basis of location data for the corresponding object; and
an object having the greatest object-specific evaluation quantity is selected as the target object.

8. A device for guiding a motor vehicle, comprising:
a control unit configured to:
form a single evaluation quantity from a plurality of input quantities that represent a traffic situation;
determine a plurality of dynamically changeable parameters based on the single evaluation quantity; and
provide control variables for guiding the motor vehicle as a function of the plurality of input quantities that represent a traffic situation and as a function of the dynamically changeable parameters;
wherein:
the plurality of input quantities include location data of located objects;
the control variables are provided for adaptive speed control of the vehicle;
a parameter selected on the basis of the single evaluation quantity relates to a selection of a target object from a plurality of located objects;
an object-specific evaluation quantity is formed for each of a plurality of located objects on the basis of location data for the corresponding object; and
an object having the greatest object-specific evaluation quantity is selected as the target object.

\* \* \* \* \*